United States Patent [19]
Harrison

[11] Patent Number: 5,879,614
[45] Date of Patent: Mar. 9, 1999

[54] METHODS OF PRODUCING WATERPROOF FELTED MATERIAL

[76] Inventor: Craig M. Harrison, 2705 Old Ivy Ct., Buford, Ga. 30519

[21] Appl. No.: 653,495

[22] Filed: May 24, 1996

[51] Int. Cl.$^6$ .................................................. B29C 51/10
[52] U.S. Cl. .................... 264/510; 156/196; 156/209; 156/212; 156/285; 156/308.2; 156/309.6; 156/309.9; 264/136; 264/137; 264/293; 264/324; 264/511; 442/398
[58] Field of Search ................... 156/309.6, 196, 156/285, 308.2, 309.9, 322, 209, 212; 264/136, 137, 324, 293, 510, 511; 442/398, 394; 428/297.4, 297.1

[56] References Cited

U.S. PATENT DOCUMENTS

| | | | |
|---|---|---|---|
| 4,319,854 | 3/1982 | Marzocchi | 404/28 |
| 4,464,215 | 8/1984 | Cogliano | 156/71 |
| 4,525,960 | 7/1985 | Kelman | 52/169.14 |
| 4,733,989 | 3/1988 | Harriett | 405/43 |
| 4,775,567 | 10/1988 | Harkness | 428/40 |
| 4,787,780 | 11/1988 | Harriett | 405/270 |
| 4,810,573 | 3/1989 | Harriett | 428/331 |
| 4,942,012 | 7/1990 | Lee et al. | 264/510 |
| 5,262,117 | 11/1993 | Addeo et al. | 264/510 |
| 5,382,461 | 1/1995 | Wu | 428/336 |

Primary Examiner—James J. Bell
Attorney, Agent, or Firm—Kennedy, Davis & Kennedy

[57] ABSTRACT

A waterproof felted material (10) has a thermoplastic polyolefin sheet (20) to which a thermoplastic fibrous polyolefin matting (30) is bonded with a portion of the fibers of the matting (40) embedded in and fused to the thermoplastic polyolefin sheet. A solidifying coating (50) may be applied to the matting.

10 Claims, 3 Drawing Sheets

METHODS OF PRODUCING WATERPROOF FELTED MATERIAL

TECHNICAL FIELD

The present invention relates to waterproof felted materials that are particularly suitable for use as recreational vehicle liners and as substrates for building construction materials.

BACKGROUND OF THE INVENTION

Waterproof felted materials presently exist for a variety of product applications. For instance, it is common for boat decks to have waterproof felted surfaces on their external decks which allow for traction of crew members' shoes while providing watertight surfaces. This material is useful to boat owners since it provides a surface which can be cleaned easily, maintains a dry boat interior, and which improves traction. Shortcomings with present-day felted boat decks are their lack of longevity and inability to conform to curved shapes.

Another example of waterproof felted materials currently in use is that of putting surfaces of miniature golf courses. This surface, or artificial grass, simulates the feel and resistance of grass on a golf course, and yet provides a waterproof surface for low maintenance and continuous player use. A shortcoming with these artificial grass surfaces is that they often separate or peel from underlying concrete substrates over the course of time. Also, they too cannot be applied to contoured shapes as unitary strips of material. For example, a putting surface straddled by two upright short walls would require three independent strips of felted material where total coverage of the surface and walls is desired. If a continuous strip of felted material is used, the felted material would lift up from the corners over time.

Various other materials have been made which provide waterproof barriers having sufficient structural integrity to withstand weathering and continuous use. These materials have typically been used to line construction surfaces such as roadways and rooftops, and the surfaces of recreational vehicle compartments such as boat decks and sports utility vehicle trunks. However, these materials often experience structural failure due to the aging of adhesive used to bind the layers. This adhesive often disintegrates over time causing a layer of a multilayered barrier to separate from an underlying substrate. Additionally, the manufacture of many of these materials requires costly production steps, which are, in many instances, labor intensive and time consuming. For instance, much of the prior art teaches rolling and pressure techniques to apply layers to a substrate. Such techniques require a large space to accommodate rollers and often several workers to operate such machinery. Examples of such structures are manufactured by the Westlake Plastic Company of the United States, the Agru Company of Belgium, the Simona Company of Germany and the Gunnie Sanyo Company of Japan. These companies manufacture fabric backed materials consisting of a woven fabric or fabric blend such as cotton, polyester or fiberglass, which is pressed into a polymeric sheet backing. Such "fabric backed" materials, often fray. In some instances the fabric can peel from their backings completely.

Waterproof barriers have been devised with multiple layers using adhesive to bind them together into an integral structure. For example, U.S. Pat. No. 4,319,854 describes a moisture control method and means for pavements and bridge deck constructions comprising layers of glass fiber mesh embedded in layers of asphalt. This moisture control method is not readily adapted for use as a moisture barrier in a recreational vehicle. U.S. Pat. No. 4,464,215 describes a process of applying a unitary construction barrier by applying to a preformed barrier structure an adhesive bituminous sheet material.

U.S. Pat. No. 4,787,780 describes a method of waterproofing with a self-sealing bentonite sheet material composite article. The method includes a layer of a flexible sheet material adhered to a layer of a composition comprising a non-hydrated water-swellable clay intimately contacted with a polypropylene, polybutene or mixtures thereof. The clay mixture is sufficiently tacky to adhere to the flexible sheet. While this method creates a waterproof barrier, it does not provide for the permanent addition of a second solidifying coating material. Neither is the connection between the clay mixture and the underlying sheet permanent.

Furthermore, the manufacture of multilayered adhesive bonded barriers often exposes workers to volatile organic compounds which are released during application of the adhesives.

Accordingly, it is seen that a need remains for a waterproof felted material which can be molded and permanently bonded to an underlying substrate. Additionally, a need remains for a waterproof felted material which can be used as a permanent substrate for a solidifying coating. A need further remains for a waterproof felted material which is not dependent on adhesive or pressure in order to maintain the bond between layers. It is to the provision of such therefore that the present invention is primarily directed.

SUMMARY OF THE INVENTION

It has now been discovered that waterproof felted materials may be produced by fusing and encapsulating felted matting to polyolefin sheets. Advantageously, these materials may be formed into various shapes such as those having flat centers bounded by upright walls by forming them in a mold. Products such as recreational vehicle trunk liners and boat deck surfaces can be made in this manner.

By applying a solidifying coating to the felted material, that is a coating which is applied in a liquid or slurry state and which solidifies over a short period of time in the presence of air, products such as boat hulls and house siding can also be made.

BRIEF DESCRIPTION OF THE DRAWINGS

FIG. 3A is a perspective schematic view and showing production of the waterproof felted material of FIG. 1 using a vacuum mold, while

DETAILED DESCRIPTION OF THE INVENTION

Figure 1:
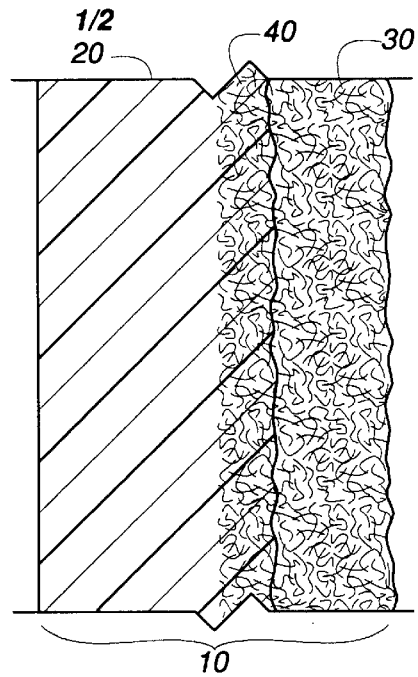
FIG. 1 is a fragmentary cross-sectional view of a waterproof felted material embodying principles of the invention in a preferred form.

With reference next to the drawings, there is shown in FIG. 1 a fragmentary section of a waterproof felted material 10 made in accordance with the invention. Waterproof felted material 10 has a sheet or sheet portion 20, a felted matting 30, and a fused portion 40. Sheet 20 is formed of a thermoplastic polyolefin such as polypropylene, polyethylene or a coextrusion of the two. Polyethylene demonstrates a greater flexibility of the two, while polypropylene demonstrates a greater rigidity. If desired, sheet 20 can be coextruded so that one side is polyethylene and the other side is polypropylene. However, the preferred embodiment is comprised of a sheet of polypropylene.

Figure 4:
FIG. 4 is a laser photocopy a fiber fused in a base layer produced in accordance with the invention.

The felted matting 30 is bonded to sheet 20 with its fibers 70 as seen in FIG. 4, adjacent the sheet 20 fused to and encapsulated within the sheet 20 to form fused portion 40. For the purposes of this application, the term felt or felted matting is meant to describe a woven and nonwoven matting preferably having thermoplastic polyolefin fibers such as polyethylene and polypropylene or a mixture thereof. Typically such matting is needle punched. Fused portion 40 is a superficial portion of sheet 20 which has fused with and encapsulated fibers 70 of felted matting 30.

Non-woven fibers are preferred as felted matting since such has larger spacial interstices between fibers than do ordinarily woven fibers. This is important where a solidifying coating is to be applied to the matting layer as in forming a side wall exterior facing for a building. In this regard, the use of thermoplastic polyolefin fiber waste from conventional carpet manufacturing processes is effective as felted matting. Since environmental conservation is now encouraged in industry, using carpet mill waste for this purpose serves to recycle a portion of this waste into a useful product. Such waste is produced by companies such as Shaw Industries of Dalton, Ga. and Bretlin Carpet of Calhoun, Ga. In the alternative, first quality grade or virgin grade felted matting can be used if a consistently colored and textured final product is desired, and no solidifying coating is to be applied.

Figure 5:
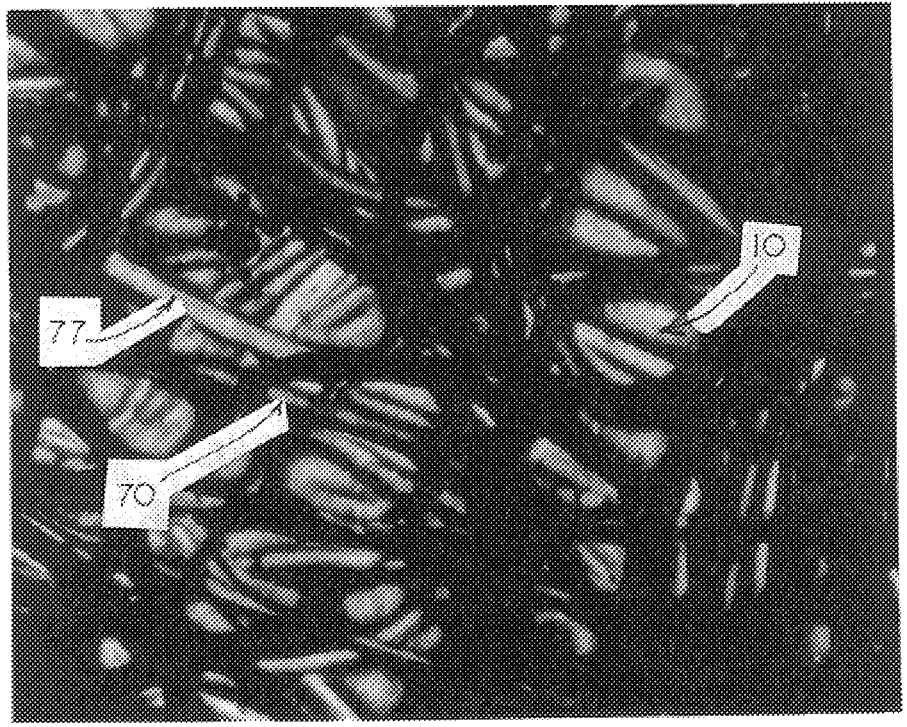
FIG. 5 is a laser photocopy a needle punched felted material (matting) fused and encapsulated to a base layer produced in accordance with the invention.

Preferably the melting point of the felted matting fibers 70 used is close to or slightly less than the melting point of sheet 20. In this manner, some of the fibers fuse to the sheet 76 while some fibers maintain their structural integrity and are encapsulated within the sheet 77 as shown in FIGS. 4 and 5. The preferred felted matting is between 3 ounces to 2 pounds weight matting having between 5–100 denier fiber thickness. This sizing of fibers typically start fusing at 360° F.

The thickness of the sheet 20 or sheet material is preferably greater than 0.030 inches (30 mil). The exact thickness of the sheet 20 is dependent upon the desired thickness of the end product. For example, the production of boxes or trays of the waterproof felted material uses sheet material of 0.125 inches (125 mil).

In manufacturing the waterproof felted material 10, sheet 20 is heated (as indicated at 60 in FIG. 3A) until it becomes formable. The sheet is heated sufficiently for the external surfaces of the sheet to approach or slightly surpass the sheet melting point. The temperature of the remaining portion of the sheet is maintained below the sheet melting point. The internal temperature is held slightly below the melting point so as to maintain the integrity of sheet 20 and to avoid sheet liquification. For example, a 0.060 inch (60 mil) polypropylene sheet is placed in a 500°–550° F. oven for 60 seconds. As a result, the sheet surface temperature is heated to between 500°–550° F. while the internal temperature of the sheet remains below the melting point. This temperature and time period will heat the surface fibers 70 of the felted matting upon contact with the sheet 20 sufficiently to fuse the matting 30 instantaneously to the sheet 20. This temperature causes a softening or flexibility of the polypropylene sheet 20 so as to render it formable. The heating temperature and time (heat soak time) required to make the sheet formable, of course, depends on the type of sheet material used and sheet thickness. The time it takes to sufficiently heat the sheet is approximately 1–2 seconds per 0.001 inch (1 mil) thickness. For instance, for a sheet of 0.125 inch, the necessary time is approximately between 125 seconds and 250 seconds.

The sheet 20 is preferably held in place within the oven by a rack which holds the sheet 20 peripheral sides, thereby allowing the sheet 20 to be exposed to radiated heat on both sides. This heating is abstractly represented in FIG. 3A as 60. Typically the sheet 20 will bow in the middle when it is heated sufficiently to be brought in contact with the felted matting 30. If the sheet 20 is heated too long or at too high a temperature, it will become molten and fall from the supporting rack and likely melt much of the felted matting 30. With reference to FIG. 3A it is seen that the sheet 20 is then brought in contact with felted matting 30. Following this contact, the heat from the sheet 20 immediately transfers to the fibers 70 of felted matting 30 causing some of the ends of the fibers to become viscous globules 76, which in turn fuse to sheet 20, as seen in FIG. 4. In FIG. 4, an individual polypropylene fiber 70 is seen fused to the sheet 20 through the formation of connecting strands 75. Some of the polypropylene fibers become encapsulated in sheet 20 of polypropylene, as seen in FIG. 5, in which the darker strands 70 represent fibers on the surface of sheet 20, while lighter strands 77 represent fibers encapsulated within sheet 20.

In the preferred embodiment, the felted matting 30 is first placed on a vacuum mold 80 and sheet 20 is drawn down over the mold by vacuum suction 90 passing through the felted matting 30. As the sheet 20 and felted matting 30 are drawn down over the mold, the residual heat remaining in sheet 20 is immediately passed through to the fibers 70 of the felted matting 30. Thus, it should be understood that the polyolefin molecules of the felted matting 30 and sheet 20 are then bonded, without the use of volatile organic compounds such as adhesives. If excessive heat is applied to sheet 20, then the fibers 70 of the felted matting 30 will melt to form a solid mass. The vacuum mold surface 80 may be patterned so that the resulting product is formed with a patterned surface.

Following this fusion, the sheet 20 and felted matting 30 are allowed to cool. In the preferred embodiment the waterproof felted material 10 is allowed to cool on the mold itself before removal. Cooling time is usually equal to heat soak time, but may run as much as 25% higher. For instance, the cooling time for a 0.125 inch polypropylene sheet runs between 2–3 minutes.

Figure 3B:
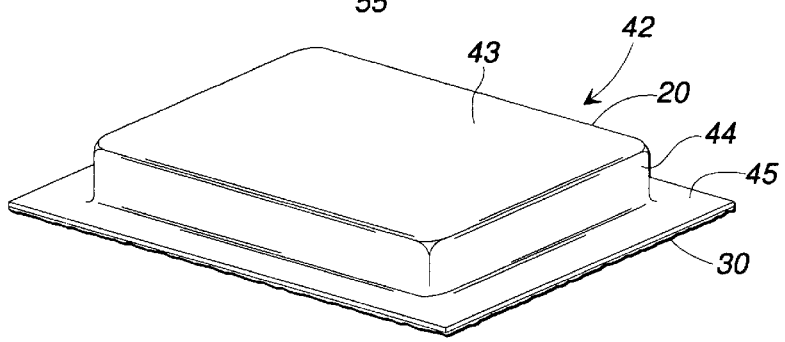
FIG. 3B is a perspective view of a finished product produced therefrom.
Figure 3A:
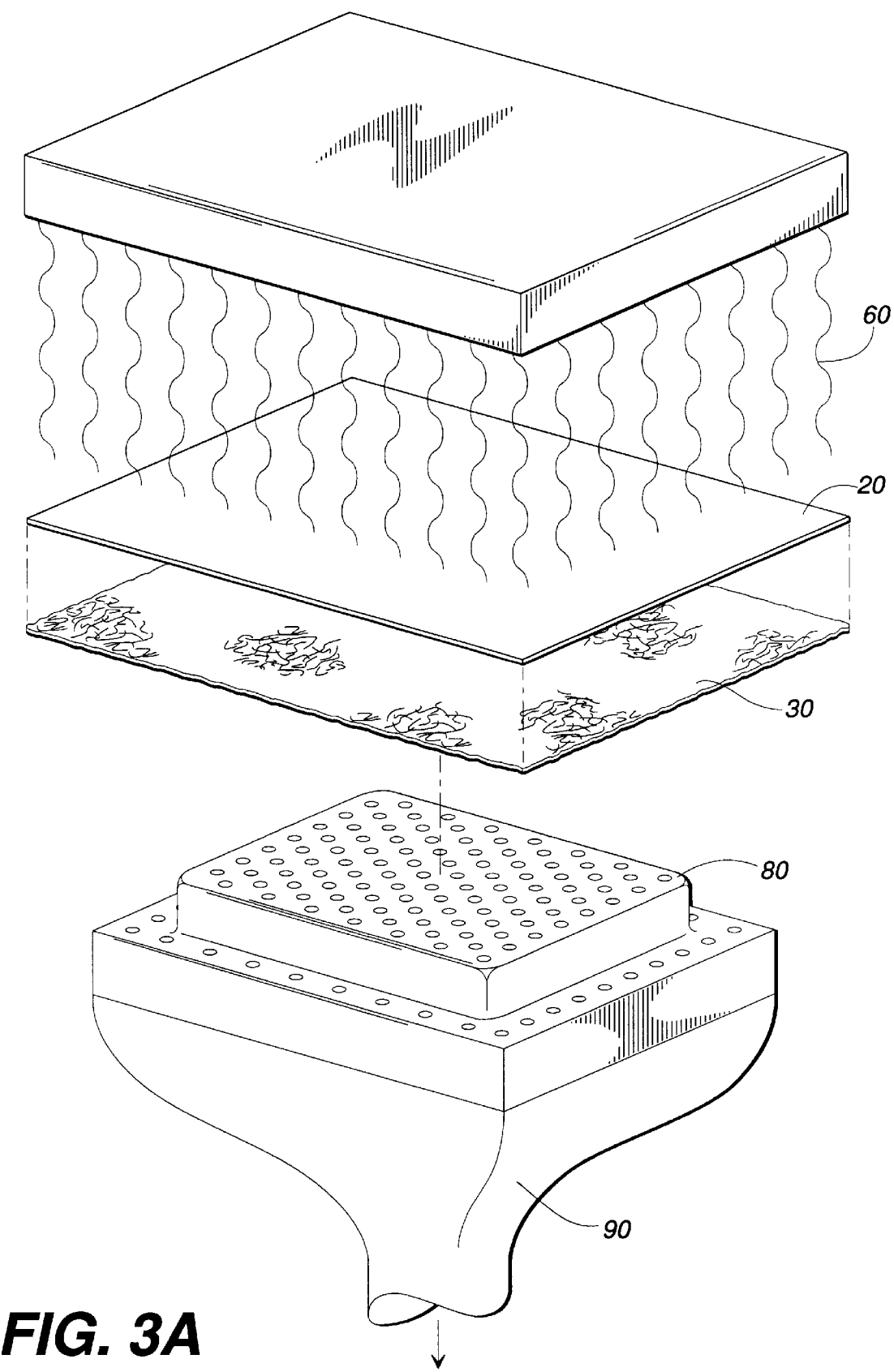

The resulting waterproof felted product 42 of FIG. 3B, shows the bottom view of a felted tray, having a bottom 43, sides 44 and a peripheral flange 45.

Figure 2:
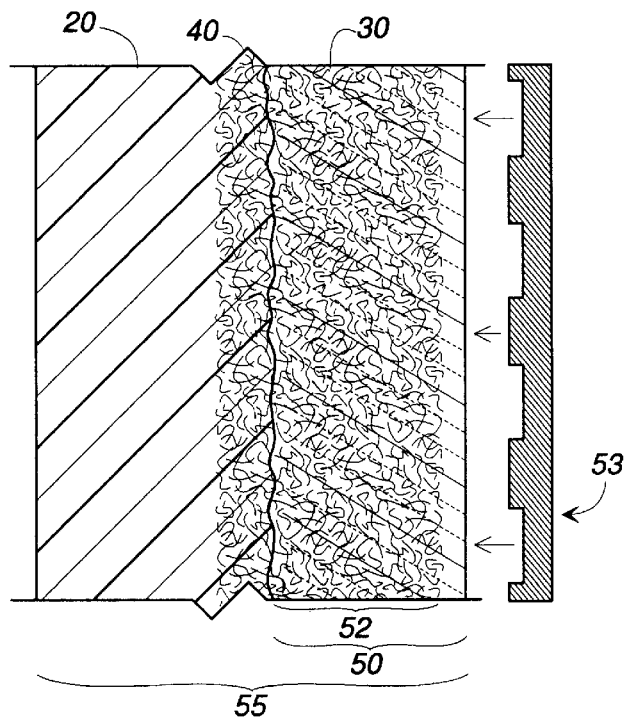
FIG. 2 is a cross-sectional view of waterproof felted material embodying principles of the invention in another preferred form.

In an alternate embodiment, after the felted matting 30 has been fused to sheet 20, a solidifying coating 50 is applied to the felted matting so as to fill the interstices between the fibers as illustrated in FIG. 2. The solidifying coating 50 is applied to the exposed matting surface 30 so that it penetrates the fibrous interstices and adheres to the sheet 20. Preferably, the solidifying coating 50 is applied as a semi-liquid or slurry, to allow for maximum penetration of the felted matting 52. It has been found that while solidifying coating 50 may in some instances bind directly to sheet 20 without requiring a felted matting 30, the presence of a felted matting 30 helps to reduce cracking of the solidifying coating 50 after it has set. Furthermore, for those substances which would not normally form a permanent hold directly to sheet 20, such as cement, which would crack off of sheet 20 if applied by itself, the felted matting 30 provides an intermediate substrate to adhere to. Such solidifying coatings 50 include fiberglass suspension mixes, cementitious mixes, plaster, epoxies, resins, foams and liquid polyurethanes. These solidifying coatings may be sprayed, poured, injected or otherwise applied as a semi-liquid or slurry onto the felted matting 30. The solidifying coating 50 material is then allowed to cure to produce the final product illustrated in FIG. 2 as 55. Prior to curing, the solidifying coating 50 can be embossed with a pattern for aesthetic appeal. For instance, a wood grain-type pattern can be applied to create the textured appearance of wood veneer by applying a three-dimensional pattern mold 53 to the solidifying coating before it dries and solidifies. The solidifying coating can cure (solidify) by being air dried.

To this end, as shown in FIGS. 3A and 3B, a method of forming a waterproof felted product has been discovered (illustrated in FIG. 3A) in which the felted matting 30 is placed over a vacuum mold 80 prior to coming into contact with the sheet 20. As seen in FIG. 3A, the surface of the mold 80 may be patterned so that the final product contains a textured pattern on its visible surface. The optimum vacuum pressure is between 10 and 27 atmospheres with the preferred pressure being above 20 atmospheres. It has been found that thinner felted matting allows for more pronounced patterning in the finished product, but less interstices among the fibers for impregnation by a solidifying coating. For instance, it has been found that a five ounce felted matting produces a clearly visible pattern.

It should also be understood that in another alternative, the waterproof felted material 10 may be produced by rollers which apply pressure to cause fusion. In this regard, a pre-heated sheet 20 or extruded form is placed in contact with a felted matting 30. Pressure is then applied by rollers to enhance the transfer of heat from the sheet 20 to the felted matting 30, thereby causing the molecules of the matting fibers 70 to bond with those of the sheet 20. The waterproof felted material 10 of FIG. 1 may be used to create objects of defined shape, such as liners for recreational vehicles, deck surfaces, animal beds, putting greens and mat surfaces requiring traction. The waterproof felted material with solidifying coating 55 of FIG. 2 may be used in products as diverse as siding for homes, bathroom wall surfaces, boat hull surfaces, and polymer-lined and polymer-coated concrete cast pipes, depending on the nature of the solidifying coating. These products are capable of long wear without the risk of peeling or structural failure due to the disintegration of adhesive bonds.

It thus is seen that a new material is now provided which is felted and waterproof, and which does not rely on adhesives to bind the layers. Such material has many applications and is neither labor intensive nor difficult to manufacture. This felted waterproof material may be manufactured with the use of recycled waste from carpet mills.

While this invention has been described in detail with particular references to preferred embodiments thereof, it should be understood that many modifications, additions and deletions may be made thereto, in addition to those expressly recited without departure from the spirit and scope of the invention as set forth in the following claims.

I claim:

1. A method of manufacturing a waterproof felted material comprising the steps of:

a) heating a thermoplastic polyolefin sheet;

b) contacting the heated thermoplastic polyolefin sheet with a thermoplastic fibrous polyolefin matting for a sufficient period of time for fibers of the matting to soften and fuse in the thermoplastic polyolefin sheet; and c) cooling the thermoplastic polyolefin sheet whereupon fibers of the thermoplastic fibrous polyolefin matting become fused and encapsulated in the polyolefin sheet to form a unified material.

2. The method of claim 1 further comprising the step of d) impregnating the thermoplastic fibrous polyolefin matting with a solidifying coating.

3. The method of claim 2 further comprising the step of e) embossing the solidifying coating with a pattern before it solidifies.

4. A method of manufacturing a waterproof felted material comprising the steps of:

a) heating a thermoplastic polyolefin sheet;

b) contacting the heated thermoplastic polyolefin sheet with a thermoplastic fibrous polyolefin matting for a sufficient period of time for heat from the heated thermoplastic polyolefin sheet to be transferred to the matting thereby causing fibers from the matting to fuse to and become encapsulated with the sheet;

c) placing the heated thermoplastic polyolefin sheet and thermoplastic fibrous polyolefin matting upon a mold with the matting facing the mold;

d) vacuum drawing the thermoplastic polyolefin sheet and thermoplastic fibrous polyolefin matting onto the mold;

e) allowing the heated thermoplastic polyolefin sheet and thermoplastic fibrous polyolefin matting to cool; and f) removing the thermoplastic polyolefin sheet and fused thermoplastic fibrous polyolefin matting from the mold.

5. The method of claim 4 further comprising the step of g) impregnating the thermoplastic fibrous polyolefin matting with a solidifying coating.

6. The method of claim 5 further comprising the step of h) embossing the solidifying coating with a texture before it cures.

7. The method of claim 4 where in the step of placing the heated thermoplastic polyolefin sheet and thermoplastic fibrous polyolefin matting upon a mold with the matting facing the mold, said mold has a pattern upon its surface.

8. A method of manufacturing a waterproof felted material comprising the steps of:

a) placing a thermoplastic fibrous polyolefin matting upon a vacuum mold;

b) vacuum drawing a heated thermoplastic polyolefin sheet onto the thermoplastic fibrous polyolefin matting whereby heat from the heated thermoplastic polyolefin sheet is transferred to the matting to cause fibers from the matting to fuse to and become encapsulated with the sheet;

c) cooling the thermoplastic polyolefin sheet and fused thermoplastic fibrous polyolefin matting; and d) removing the thermoplastic polyolefin sheet and fused thermoplastic fibrous polyolefin matting from the mold.

9. The method of claim 8 further comprising the step of impregnating the thermoplastic fibrous polyolefin matting with a solidifying coating.

10. The method of claim 9 further comprising the step of texturing the solidifying coating.

\* \* \* \* \*